SEARCH ROOM 360-113. OR RE26,610 SR

June 24, 1969 H. A. DE KOSTER Re. 26,610

TRANSDUCER HAVING A MAGNETO-RESISTIVE BRIDGE CIRCUIT

Original Filed Aug. 1, 1963 Sheet 1 of 2

INVENTOR
HEINZ A. de KOSTER
BY
Flehr and Swain
ATTORNEYS

TRANSDUCER HAVING A MAGNETO-RESISTIVE BRIDGE CIRCUIT

Original Filed Aug. 1, 1963

INVENTOR
HEINZ A. de KOSTER
BY
Fleht and Swain
ATTORNEYS

United States Patent Office

Re. 26,610
Reissued June 24, 1969

26,610

TRANSDUCER HAVING A MAGNETO-RESISTIVE BRIDGE CIRCUIT

Heinz A. de Koster, Stamford, Conn., assignor, by direct and mesne assignments, to Seggos Industries, Inc., Stamford, Conn., a corporation of Delaware Original No. 3,274,575, dated Sept. 20, 1966, Ser. No. 299,333, Aug. 1, 1963. Application for reissue Feb. 26, 1968, Ser. No. 710,441

Int. Cl. G11b *5/30;* H04r *15/00*

U.S. Cl. 340—174.1 24 Claims

Matter enclosed in heavy brackets [ ] appears in the original patent but forms no part of this reissue specification; matter printed in italics indicates the additions made by reissue.

*ABSTRACT OF THE DISCLOSURE*

*A head is provided for reading magnetic signals recorded on a moving tape or other type of record medium. The head, which in its preferred form comprises a magnetic flux bridge configuration containing four magnetoresistive elements, is sensitive to the absolute flux level rather than to the time rate of change. Accordingly, the output is independent of frequency of the recorded signal, and independent of the speed of tape transport. In addition, it provides unprecedented output levels. The four magnetoresistive elements of the flux bridge are connected into an electrical bridge configuration circuit in which all of the impedance changes caused by flux variations affect the electrical output additively.*

This invention relates generally to a transducer utilizing magneto-resistive elements arranged in an electromagnetic bridge circuit in such a manner that an unbalance of the magnetic circuit generates an electrical signal output. The invention is more particularly directed to a transducer suitable for transducing magnetic recordings.

Transducers for magnetic recording have generally included a magnetic head of the type including a core having an air gap which cooperates with the magnetic fields of the recording to be transduced. The magnetic fields flow through the low reluctance core material. A coil cooperates with the core and a voltage is induced in the coil as the magnetic fields change. The magnetic fields must be changing or varying fields to induce a voltage in the coil. The voltage induced is proportional to both the flux and the rate of change of flux. The output of the transducer is, therefore, dependent upon the frequency of the changing magnetic fields. Equalizing circuits are associated with the output of the transducer to compensate for the latter effect.

It is a general object of the present invention to provide an improved transducer.

It is another object of the present invention to provide a magnetic transducer capable of operation from D.-C. to frequencies of 10 megacycles or more.

It is another object of the present invention to provide a transducer whose response is linear with frequency.

It is a further object of the present invention to provide a transducer which is temperature insensitive, rugged and easy to manufacture.

It is still a further object of the present invention to provide a transducer capable of providing an output signal having relatively large power to eliminate in many instances the necessity for preamplifiers.

It is still a further object of the present invention to provide a transducer which is capable of providing an amplitude modulated carrier output wave.

It is a further object of the invention to provide a transducer for comparing signal waveforms.

The foregoing and other objects of the invention will become more clearly apparent from the following description taken in conjunction with the accompanying drawings.

Referring to the drawing.

Figure 6A:
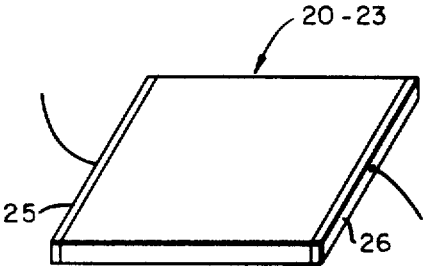
Figure 6B:
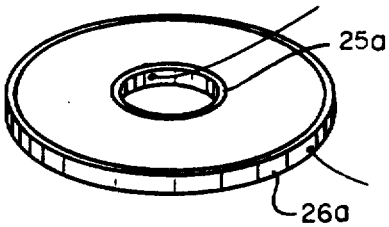
Figure 4:
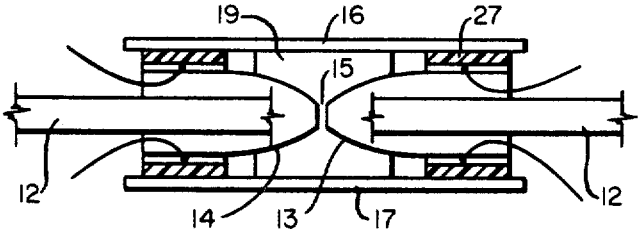
FIGURE 4 is a front view of the device shown in FIGURE 1.
Figure 7:
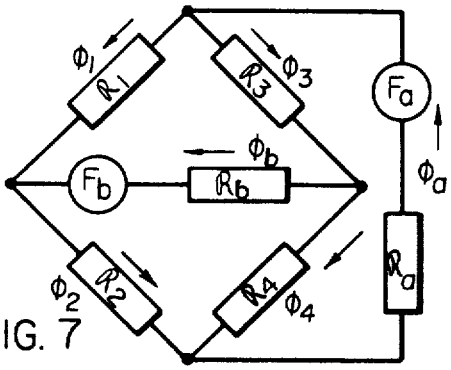
Figure 12:
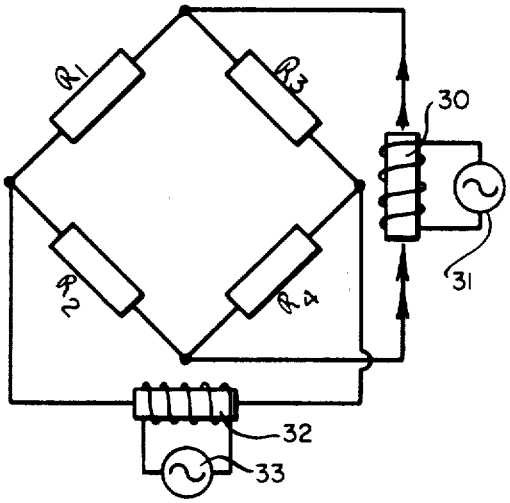
Figure 8:
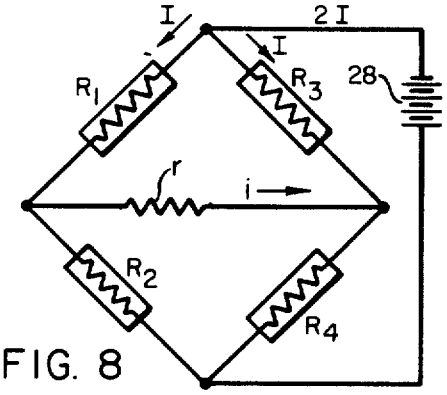
Figure 10:
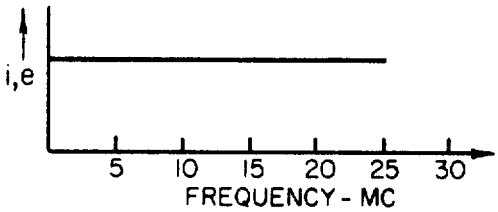
Figure 11:
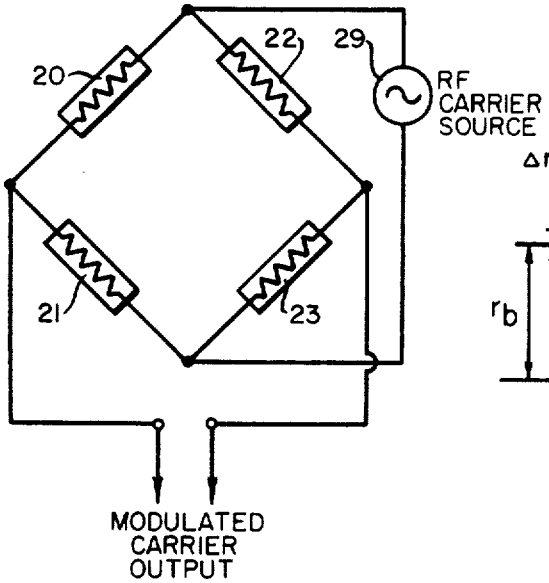
Figure 9:
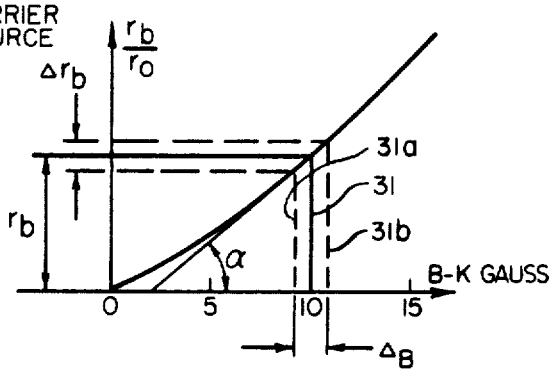

FIGURES 6A and 6B schematically illustrate magneto-resistive elements which can be employed in the transducer;

FIGURE 7 is the equivalent magnetic circuit for the transducer illustrated in FIGURES 1–5;

FIGURE 8 is the equivalent electrical circuit for the transducer illustrated in FIGURES 1–5;

FIGURE 9 is a typical curve of resistance as a function of flux for a magneto-resistive element;

FIGURE 10 is a curve showing the frequency response of the transducer;

FIGURE 11 shows another embodiment of the invention;

FIGURE 12 shows still another embodiment of the invention.

Figure 1:
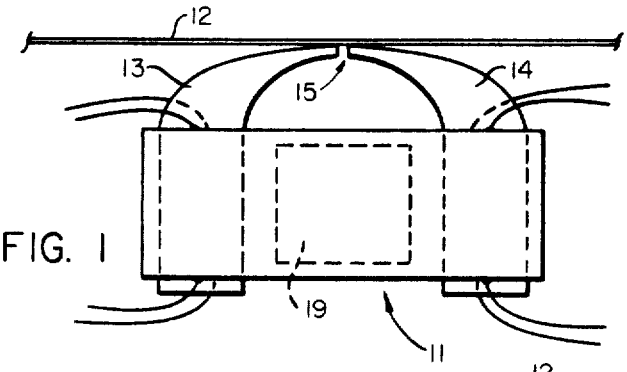
FIGURE 1 is a plan view of the transducer in cooperation with a magnetic tape.
Figure 5:
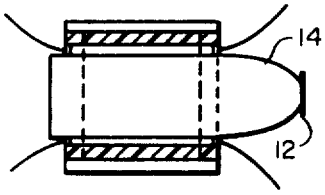
FIGURE 5 is a side elevational view of the device shown in FIGURE 1.
Figure 2:
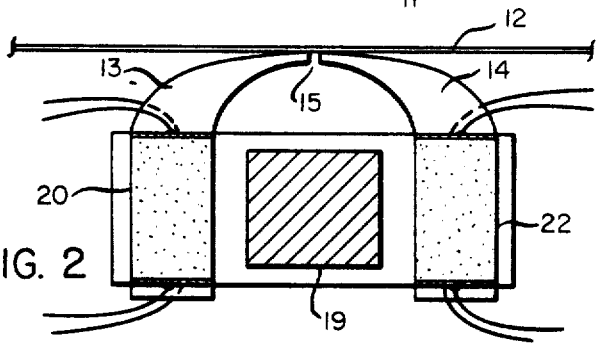
FIGURE 2 is a sectional view taken along the line 2—2 of FIGURE 3B.

Referring to the drawing, FIGURES 1 and 2, there is shown a transducer 11 disposed to cooperate with a magnetic recording element 12 which may, for example, be an elongated magnetic tape. Transducer 11 includes a pair of pole pieces 13 and 14 having tips which extend towards one another to define a reproducing gap 15. The pole pieces include a portion which is accommodated in the magnetic bridge assembly, to be presently described. The pole pieces may, for example, be constructed from mu-metal if the magnetic head is used only for relatively low frequencies. For operation at higher frequencies, the magnetic material may be ferrite or the like.

Figure 3A:
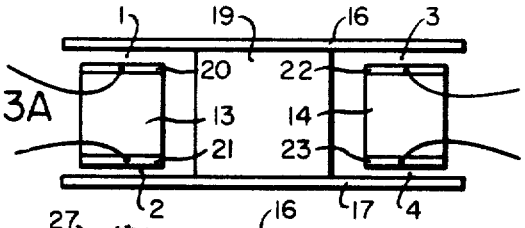
FIGURES 3A and 3B are rear views of the device shown in FIGURE 1.
Figure 3B:
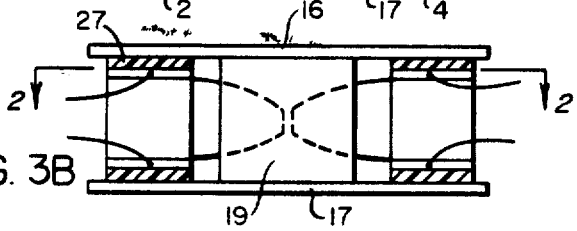

The pole pieces, FIGURES 3A and 3B, are disposed between and magnetically cooperate with spaced plates 16 and 17 which are likewise made of low reluctance magnetic material. The plates 16 and 17 are arranged in cooperative relationship with a permanent magnet 19 which is in contact with each of the members. The magnet is magnetized so as to provide a magnetic field. The magnetic field provides a bias field as will be presently described.

The thickness of the magnet 19 is such that the plates 16 and 17 which are in contact with the ends have a spacing greater than the thickness of the pole pieces 13 and 14 whereby there are provided four gaps 1–4, FIGURE 3A, between the plates and the pole pieces.

Magneto-resistive elements 20–23 are placed in the gaps so that they are traversed by the magnetic fields which flow in the path between the plates 16 and 17 and the pole pieces 13 and 14. The elements may, for example, be secured to the pole pieces 13 and 14.

Referring to FIGURES 6A and 6B, typical elements are shown. The elements may be indium antimonide or other magneto-resistive solid state compounds or elements formed into a thin film, wafer or disc. The ohmic resistance of the element is dependent upon the applied magnetic field. The magneto-resistive element is provided with spaced ohmic contacts 25 and 26 between which the resistance is measured. The element shown in FIGURE 6A is a rectangular disc while the element shown in FIGURE 6B is a disc of the type known as a carbino disc.

To support the pole pieces between the plates 16 and 17, there may be provided a plastic filler material 27, FIGURE 3B, such as a thermosetting plastic.

Referring now more particularly to FIGURE 7, there is shown the magnetic circuit just described. The symbols $\mathcal{R}_1$, $\mathcal{R}_2$, $\mathcal{R}_3$, and $\mathcal{R}_4$ correspond to the reluctance at the gaps 1, 2, 3, and 4. The magneto-motive force generator $F_a$ corresponds to the magnet 19. The reluctance $\mathcal{R}_a$ represents the reluctance offered by the path for the flux $\phi_a$ from the permanent magnet. The magneto-motive force generator $F_b$ corresponds to the magnetic fields $\phi_b$ at the gap, which fields are to be transduced. The flux $\phi_1$, $\phi_2$, $\phi_3$ and $\phi_4$ corresponds to flux at the gaps 1–4, which is the sum of the fluxes in each arm of the bridge. The reluctance $\mathcal{R}_b$ is the reluctance offered to the flux $\phi_b$.

It is thus seen that the transducer shown in FIGURES 1–5, in essence, forms a magnetic bridge circuit with each of the arms of the bridge including one of the gaps, while one pair of opposite [terminals] *arms* of the bridge receives the flux [$\phi_a-\phi_b$] $\phi_a/2-\phi_b/2$ and the other pair of opposite [terminals] *arms* receives the flux [$\phi_a+\phi_b$] $\phi_a/2+\phi_b/2$.

The biasing flux $\phi_a$ is required so that the magneto-resistive elements are biased to a point in their characteristics which provides optimal operation and linear response with change in total flux. Reference is made to FIGURE 9 wherein there is shown typical characteristics of a magneto-resistive element. It is observed that operation at the solid line 31 provides a change in resistance with a change in flux above and below this value, as indicated by the dotted lines 31a and 31b, which is substantially linear. At other operating points on the curve, the response is slightly non-linear.

In operation, the various magneto-resistive elements are connected in an electrical bridge circuit such as that shown in FIGURE 8 wherein resistances $R_1$, $R_2$, $R_3$ and $R_4$ correspond to the resistance of each of the magneto-resistive elements disposed in the corresponding gaps 1–4 represented by the reluctances $\mathcal{R}_1$, $\mathcal{R}_2$, $\mathcal{R}_3$, and $\mathcal{R}_4$ in FIGURE 7. The electrical bridge is energized through a suitable energizing source, for example, the schematically illustrated battery 28. The output i is obtained across the other pair of terminals. This current is proportional to the change in flux due to the magnetic fields at the reproducing gap 15, as will be presently described in detail.

The following analysis more clearly illustrates the operation of the transducer. The following symbols are employed, as previously described:

Gap reluctances: $\mathcal{R}_1, \mathcal{R}_2, \mathcal{R}_3, \mathcal{R}_4$

Reluctance of magnetic parts: $\mathcal{R}_a, \mathcal{R}_b$

Magneto motive forces: $F_a$, $F_b$
Flux due to permanent magnet: $\phi_a$
Flux due to magnetic fields: $\phi_b$
Flux at gaps: $\phi_1$, $\phi_2$, $\phi_3$, $\phi_4$ Assume that the circuit is balanced $$[\mathcal{R}_1=\mathcal{R}_4]\ \mathcal{R}_1=\mathcal{R}_3$$

$$[\mathcal{R}_2=\mathcal{R}_3]\ \mathcal{R}_2=\mathcal{R}_4$$

then flux $\phi_a$ will divide equally.

Assume direction indicated for $\phi_b$.

Then $$[\phi_1=\phi_a/2-\phi_b]\ \phi_1=\phi_a/2-\phi_b/2 \quad (1)$$

$$[\phi_2=\phi_a/2+\phi_b]\ \phi_2=\phi_a/2+\phi_b/2 \quad (2)$$

$$[\phi_3=\phi_a/2+\phi_b]\ \phi_3=\phi_a/2+\phi_b/2 \quad (3)$$

$$[\phi_4=\phi_a/2+\phi_b]\ \phi_4=\phi_a/2-\phi_b/2 \quad (4)$$

Assume that *the* magneto-resistive elements *have equal electrical resistances prior to application of fluxes* $\phi_a$ *and*

$\phi_b$, *but that after application of these two fluxes they* have resistances $R_1$, $R_2$, $R_3$, $R_4$ and are located at the respective gaps [,] ; then *since* $\phi_1=\phi_4$ *(from Equations 1 and 4 above) and* $\phi_2=\phi_3$ *(from Equations 2 and 3 above)* [for bridge balance]

$$R_1=R_4=R_o \quad (5)$$

$$R_2=R_3=R_m \quad (6)$$

E is voltage applied across bridge
i=load current
r=load resistance

Then $$\left[i=E\frac{R_o^2-R_m^2}{2R_oR_m(R_o-R_m)+r(R_o+R_m)^2}\right] \quad (7)$$

$$i=E\frac{R_m^2-R_o^2}{2R_oR_m(R_o-R_m)+r(R_o+R_m)^2}$$

If $r_b$ is resistance of element at operating point and $\Delta r_b$ is change due to flux [$\phi_b$] $\phi_b/2$ $$R_o=r_b-\Delta r_b \quad (8)$$

$$R_m=r_b+\Delta r_b \quad (9)$$

Substituting in Equation 7 the voltage across r is:

$$e=E\frac{r\Delta r_b}{r_b^2+rr_b-(\Delta r_b)^2} \quad (10)$$

the current is:

$$i=E\frac{\Delta r_b}{r_b^2+rr_b-(\Delta r_b)^2} \quad (11)$$

$$r_b>>\Delta r_b \quad (12)$$

Then $$e\cong E\frac{r\Delta r_b}{r_b(r_b+r)} \quad (13)$$

$$i\cong E\frac{\Delta r_b}{r_b(r_b+r)} \quad (14)$$

The output power is $$P=ei=E^2\frac{r\Delta r_b^2}{r_b^2(r_b+r)^2} \quad (15)$$

When $r=r_b$ maximum power output is obtained $$[P_{max}=E^2/4r_b(4r_b/r_b) \quad (16)]$$

$$P_{max}=E^2/4r_b(\Delta r_b/r_b) \quad (16)$$

and $$e=E/2(\Delta r_b/r_b) \quad (17)$$

$$i=E/2r_b(\Delta r_b/r_b \quad (18)$$

Since $r_b$ and r are fixed, the current across the load resistance is proportional to $\Delta r_b$, the change in resistance of the magneto-resistive element due to the flux.

The sensitivity is obtained by selecting a point of operation, FIGURE 9, such as the flux B, and a magneto-resistive element such as carbino disc. The angle of sensitivity is given by $$\tan\alpha=r_b/Br_o$$

and $$r_b=r_oB\tan\alpha \quad (19)$$

$$\Delta r_b=\Delta Br_o\tan\alpha \quad (20)$$

$$\Delta r_b/r_b=\Delta B/B \quad (21)$$

Substituting Equations 19, 20 and 21 in Equations 16, 17 and 18:

$$P_{max}=\frac{E^2}{4r_oB\tan\alpha}\left(\frac{\Delta B}{B}\right)^2 \quad (22)$$

$$e=\frac{E}{2}\left(\frac{\Delta B}{B}\right) \quad (23)$$

$$i=\frac{E}{2r_oB\tan\alpha}\left(\frac{\Delta B}{B}\right) \quad (24)$$

The magneto-resistive effect is independent of frequency from D.-C. up to 35 mc. or more. Referring to Equations 13 and 14 above, it is noted that only the terms $\Delta r_b$ and $r_b$ appear. Thus, the output voltage and current are frequency independent. FIGURE 10 shows the frequency response of the transducer.

If maximum permissible power dissipation per element is $P_{diss}$, then the current through any branch of the bridge is $$I=\sqrt{P_{diss}/r_b} \quad (25)$$

The voltage is:

$$E=2Ir_b$$

Substituting in Equation 25:

$$E=2\sqrt{r_bP_{diss}} \quad (26)$$

Substituting in Equation 22 and using Equation 19 the maximum power is:

$$P_{max}=P_{diss}(\Delta B/B)^2 \quad (27)$$

The following Examples I and II illustrate typical outputs for a transducer in accordance with the invention:

Example I

Employing a carbino disc $P_{diss}=2.5$ watts
$B=10$ kilogauss
$\Delta B=0.1$ kilogauss
$P_{max}=2.5(0.1/10)^2=0.25$ milliwatts With typical disc having $r_o=20$ ohms
$r_b/r_o=20$
$r_b=400$ ohms and $E=2\sqrt{r_bP_{diss}}=63$ volts
$I=E/2r_b=79$ milliamperes
[$e=E/2(4B/B)=315$ millivolts]
*$e=E/2(\Delta B/B)=315$ millivolts*
$i=e/r_b=.79$ milliampere Example II Employing a rectangular element $P_{diss}=2.5$ watts
$B=10$ kilogauss
$\Delta B=0.1$ kilogauss
$P_{max}=0.25$ milliwatt For typical element $r_o=1250$ ohms
$r_b/r_o=1.5$
$r_b=1880$ ohms and $E=137$ volts
$I=36.5$ milliamperes
$e=680$ millivolts
$i=0.35$ milliampere Thus it is seen that relatively large output power, voltage and currents can be obtained. In certain instances the output may be sufficient to drive an associated circuit, such as a speaker, directly.

Referring to FIGURE 11 there is shown an electrical bridge of a transducer of the type previously described. The resistive elements of the bridge bear reference numbers corresponding to those of the magneto-resistive elements 20–23.

The bridge is excited by connecting an R.-F. carrier source 29 across one pair of the bridge terminals and obtaining the output at the other pair of terminals. The output will be a modulated carrier whose modulation corresponds to the parameter being transduced, such as the magnetic recording.

It is apparent from a consideration of the principles set forth in detail above that unbalance of the magnetic bridge by any means will result in an output signal. Thus, if a force is applied to an end of one of the plates to change the corresponding gap, the bridge reluctance will be unbalanced. As a result, the biasing flux is unbalanced and an output signal will be generated which is proportional to the change in gap. This can then be employed to product a force transducer, load cell or even an accelerometer.

The transducer may be connected to measure distortion and/or phase shift. Referring to FIGURE 12 the magnetic bridge circuit previously described is illustrated. Connected to provide magnetic flux across one pair of terminals is the electromagnet 30 whch is excited by a first signal source 31. Connected to provide flux across the other pair of bridge terminals is the electromagnet 32 excited by a second signal source 33.

If the signals 31 and 33 are identical there will be no magnetic unbalance and no output will be derived from the electrical bridge. However, if one wave differs from the other in phase and/or shape an output will be derived from the electrical bridge.

Thus the transducer described can be magnetically biased either with a steady flux, an alternating flux or both, which is generated by permanent magnets, electromagnets or both. The electrical bridge can likewise be excited with a current which is A.-C., or D.-C. or both. The parameters which are applied and transduced can be mechanical, electrical, magnetic or a combination of the same.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. A transducer comprising a magnetic bridge having five arms and four terminals providing in each of its arms a path for magnetic flux and a high reluctance gap, an electrical bridge including in each of its arms a magneto-resistive element, a magneto-resistive element in each arm of the electrical bridge being disposed in a corresponding gap in the arm of the magnetic bridge so that the flux in the respective arm of the magnetic bridge passes therethrough, means for exciting said electrical bridge connected across one opposite pair of bridge terminals, the other opposite pair of electrical bridge terminals providing an otuput signal, and means responsive to a parameter to be transduced for unbalancing the magnetic bridge by varying the reluctance at one or more of said high reluctance gaps.

2. A transducer as in claim 1 including additionally means for providing a biasing magnetic flux across at least one pair of opposite magnetic bridge terminals.

3. A transducer as in claim 1 including additionally means for applying an alternating flux across at least one pair of opposite magnetic bridge terminals.

4. A transducer as in claim 1 in which said means for exciting said electrical bridge comprises a source of D.-C. voltage.

5. A transducer as in claim 1 in which said means for exciting said electrical bridge comprises a source of A.-C. voltage.

6. A transducer comprising a magnetic bridge having five arms and four terminals providing in each of its arms a path for magnetic flux and a high reluctance gap, a pair of pole pieces *forming one of said arms and* including a reproducing gap forming *one of said gaps, said pole pieces also forming* a pair of opposite terminals of said magnetic bridge, an electrical bridge including in each of its arms a magneto-resistive element, a magneto-resistive element in each of the arms of the electrical bridge being disposed in the gap in each arm of the magnetic bridge so that the flux in the respective arm of the magnetic bridge passes therethrough, means for exciting said electrical bridge across one opposite pair of terminals, and means connected across the other opposite pair of terminals of the electrical bridge providing an electrical output signal, magnetic flux applied to said reproducing gap serving to unbalance the magnetic bridge and provide an electrical output signal.

7. A transducer as in claim 6 including additionally means for providing a biasing magnetic flux across at least one pair of magnetic bridge terminals.

8. A transducer as in claim 6 including additionally means for applying an alternating flux across at least one pair of magnetic bridge terminals.

9. A transducer as in claim 6 in which said means for exciting said electrical bridge comprises a source of D.-C. voltage.

10. A transducer as in claim 6 in which said means for exciting said electrical bridge comprises a source of A.-C. voltage.

11. A transducer comprising a permanent magnet having first and second poles, a pair of plates disposed in cooperative relationship with said magnet, first and second pole pieces disposed between said plates and forming therewith magnetic gaps, said pole pieces forming a first pair of opposite terminals of a magnetic bridge and said plates forming a second opposite pair of terminals of a magnetic bridge with a gap disposed in each arm of the magnetic bridge between terminals of the magnetic bridge, an electrical bridge including in each of its arms a magneto-resistive element, a magneto-resistive element in each arm of the electrical bridge being disposed in one of the magnetic gaps of the magnetic bridge whereby the flux traversing the gap passes therethrough, means for exciting said electrical bridge across one pair of terminals, said other pair of terminals of said electrical bridge providing an electrical output signal.

12. A transducer as in claim 11 wherein said pole pieces include tips which define a transducing gap.

13. A transducer as in claim 11 including additionally means for providing a biasing magnetic flux across one pair of said magnetic bridge terminals.

14. A transducer as in claim 11 including additionally means for applying an alternating flux across one pair of said magnetic bridge terminals.

15. A transducer as in claim 11 including additionally means for providing a biasing magnetic flux across one pair of said magnetic bridge terminals.

16. A transducer as in claim 11 including additionally means for applying an alternating flux across one pair of said magnetic bridge terminals.

17. A transducer comprising a magnetic bridge having four arms, each of said arms providing a path for magnetic flux and each including a high reluctance gap, adjacent arms being magnetically connected to form bridge terminals, and four magneto-resistive elements one disposed in each of said arms in said gap, each of said elements including two terminals for connecting the same to associated electrical circuits.

*18. A magnetic flux transducer comprising:*

*(a) a pair of permeable pole pieces fixed in spaced relation to each other to define a reproducing gap therebetween for picking up a magnetic flux in said gap;*

*(b) means for completing a magnetic circuit between said pole pieces including at least one magneto-resistive element interposed in the path of said flux so as to vary the resistance thereof as a function of said flux strength;*

*(c) and an electrical bridge circuit connected to include said magneto-resistive element as one of the arms thereof so that variations in the resistance of said magneto-resistive element affect the condition of balance of said bridge.*

*19. A magnetic flux transducer according to claim 18, wherein said pole pieces are arranged to conduct said flux away from said gap, and said magneto-resistive element is displaced from said gap so as to sense the gap flux from a distance.*

*20. A magnetic flux transducer according to claim 19 wherein:*

*(a) said magnetic-circuit-completing means is arranged to divide said gap flux into two paths having a parallel circuit relationship between said pole pieces;*

*(b) there are at least two magneto-resistive elements, one of which is interposed in one of said parallel flux paths and the other of which is interposed in the other of said parallel flux paths so as to vary the resistances of both said elements as a function of said flux strength;*

*(c) and said two magneto-resistive elements are connected in two respective diagonally opposite arms of said electrical bridge so as to produce a mutually aiding effect on the condition of balance of said bridge.*

*21. A transducer comprising a magnetic bridge having five arms and four terminals providing in each of its arms a path for magnetic flux and a high reluctance gap, an electrical bridge including in each of at least two diagonally opposite arms a magneto-resistive element, each of said magneto-resistive elements being disposed in one of said gaps in the arms of said magnetic bridge so that the flux in the respective arm of the magnetic bridge passes therethrough, means for exciting said electrical bridge connected across one opposite pair of bridge terminals, the other opposite pair of electrical bridge terminals providing an output signal, and means responsive to a parameter to be transduced for unbalancing the magnetic bridge by varying the reluctance at one or more of said high reluctance gaps.*

*22. A transducer comprising a magnetic bridge having five arms and four terminals providing in each of its arms a path for magnetic flux and a high reluctance gap, a pair of pole pieces forming one of said arms and including a reproducing gap forming one of said gaps, said pole pieces also forming a pair of opposite terminals of said magnetic bridge, an electrical bridge including in each of at least two diagonally opposite arms a magneto-resistive element, each of said magneto-resistive elements being disposed in one of said gaps in an arm of said magnetic bridge so that the flux in the respective arm of the magnetic bridge passes therethrough, means for exciting said electrical bridge across one opposite pair of terminals, and means connected across the other opposite pair of terminals of th electrical bridge providing an electrical output signal, magnetic flux applied to said reproducing gap serving to unbalance the magnetic bridge and provide an electrical output signal.*

*23. A transducer comprising a permanent magnet having first and second poles, a pair of plates disposed in cooperative relationship with said magnet, first and second pole pieces disposed between said plates and forming therewith magnetic gaps, said pole pieces forming a first pair of opposite terminals of a magnetic bridge and said plates forming a second pair of terminals of a magnetic bridge with a gap disposed in each of at least two arms of the magnetic bridge between terminals of the magnetic bridge, an electrical bridge including in each of at least two diagonally opposite arms a magneto-resistive element, each of which is disposed in one of the magnetic gaps of the magnetic bridge whereby the flux traversing the gap passes therethrough, means for exciting said electrical bridge across one pair of terminals, said other pair of terminals of said electrical bridge providing an electrical output signal.*

*24. A transducer comprising a magnetic bridge having four arms, each of its arms providing a path for magnetic flux and each of at least two of its arms including a high reluctance gap, adjacent arms being magnetically*

*connected to form bridge terminals, and magneto-resistive elements disposed in each of said gaps, each of said elements including two terminals for connecting the same to associated electrical circuits.*

References Cited

The following references, cited by the Examiner, are of record in the patented file of this patent or the original patent.

UNITED STATES PATENTS

| | | | |
|---|---|---|---|
| 3,046,361 | 7/1962 | Wiehl | 179—100.41 |
| 3,061,771 | 10/1962 | Planer et al. | 179—100.41 |
| 2,969,529 | 1/1961 | Gilson | 340—174.1 |

TERRELL W. FEARS, *Primary Examiner.*

U.S. Cl. X.R.

179—100.2; 346—74